No. 819,753. PATENTED MAY 8, 1906.
C. GLOVER.
BALL BEARING CONE.
APPLICATION FILED FEB. 23, 1906.
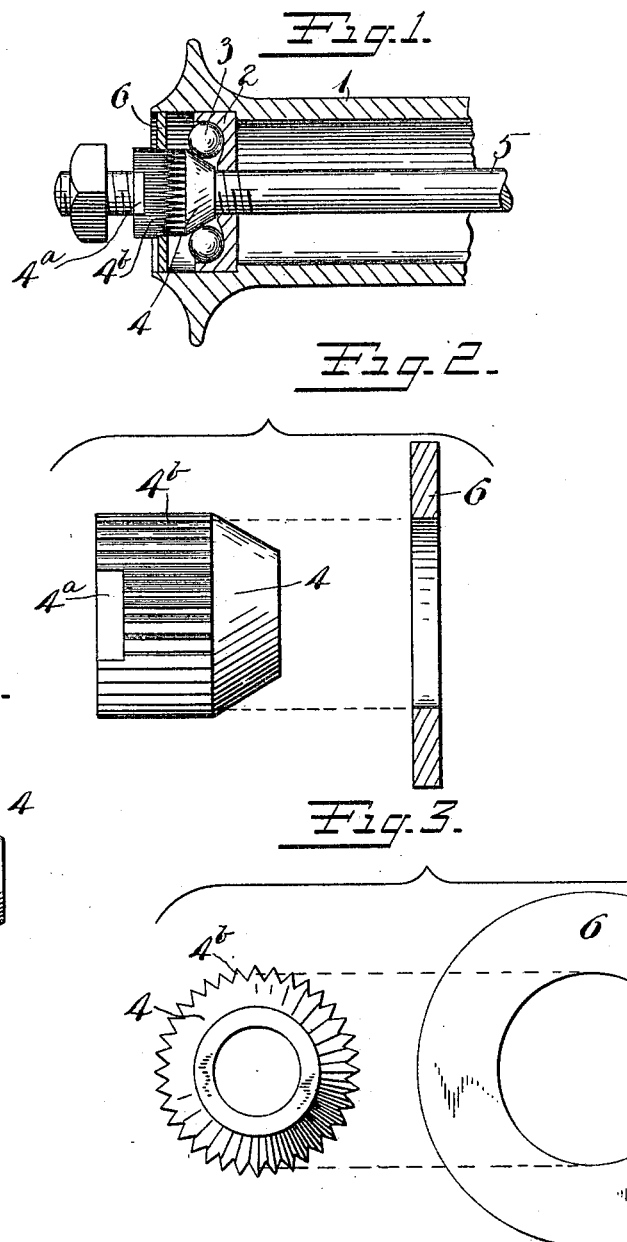
Witnesses
Inventor
CHARLES GLOVER
By his Attorneys

UNITED STATES PATENT OFFICE.

CHARLES GLOVER, OF NEW BRITAIN, CONNECTICUT, ASSIGNOR TO CORBIN SCREW CORPORATION, OF NEW BRITAIN, CONNECTICUT, A CORPORATION OF CONNECTICUT.

BALL-BEARING CONE.

No. 819,753.  Specification of Letters Patent.  Patented May 8, 1906.

Application filed February 23, 1906. Serial No. 302,377.

*To all whom it may concern:*

Be it known that I, CHARLES GLOVER, a citizen of the United States, residing at New Britain, Connecticut, have invented certain new and useful Improvements in Ball-Bearing Cones, of which the following is a full, clear, and exact description.

My invention relates to improvements in ball-bearings for wheels; and it consists mainly in improving the cone portion thereof.

In ball-bearings a cone is employed to take up or adjust the bearing proper, which bearing is ordinarily within or inside of the hub. A cone is provided to accomplish this end. The hub is usually considerably larger than the cone. Hence it is desirable to provide a means in connection with the cone to close the outer end of the hub and render it substantially dust-proof. This closure device is usually carried by the cone and comprises a washer which heretofore has been specially shaped to engage with the specially-shaped cone so that it could be adjusted thereon as desired, suitable adjusting mechanism being likewise employed.

My invention dispenses with the necessity for any adjusting mechanism, and the construction is such that the protecting-collar may be driven onto the cone and securely retained against independent rotation and in its desired position without the necessity of any special formation in the washer or the use of any adjusting appliances.

In the accompanying drawings, Figure 1 is a sectional view of a hub provided with a ball-bearing and showing my improved cone in elevation, the dust-protector being shown in section thereon. Fig. 2 is a relatively enlarged view of the cone and protector before they are assembled. Fig. 3 is a front elevation of the parts shown in Fig. 2. Fig. 4 is a side elevation of the parts assembled, said view being on a relatively larger scale than that indicated in Fig. 1 and relatively smaller than shown in Figs. 2 and 3.

While the particular construction of the hub is immaterial to my invention, nevertheless for the purpose of illustration I have shown a portion of a hub with my invention applied thereto.

1 represents a wheel-hub of the usual construction. 2 is a ball-race therein. 3 3 are balls seated in said race.

4 is that portion of the cone which bears against the balls and by which the desired adjustment is effected, the said cone screwing onto a central shaft 5.

4$^a$ represents slabbed-off sides at the rear end of the cone to afford surfaces suitable to receive a wrench.

4$^b$ represents longitudinally-arranged knurls on the periphery of the cylindrical part of the cone, said knurls extending, preferably entirely, around said cylindrical portion.

6 is a washer of ordinary construction, the internal diameter of which is slightly less than the largest diameter of the cone measured to the apices of the knurls thereon. This internal diameter of the washer is, however, greater than the smallest diameter of the periphery of the cone—that is, measured from the bottom of the grooves formed by knurls. The cone and the washer 6 are assembled by passing the washer over the tapered end of said cone and then driving it onto the knurled portion to the desired extent. This may be quickly and easily effected. The knurling of the largest diameter of the cone provides a weakened surface which gives way as the washer is driven on and yet stands up with sufficient force to afford an intimate and effective connection for the washer.

In Fig. 3 a portion of the knurls over which the washer has been passed are graphically illustrated as slightly broken down as a result of driving the washer over them. The fit of the washer on the cone is so close that wherever it is placed there it will remain, being held with sufficient security to prevent longitudinal or independent rotative movement on said cone. This latter feature is of advantage, because if it is desired to trim down the edge of the washer so that it will fit the particular hub with which it is to be used the said cone may be placed in a lathe and the diameter of the washer reduced without danger of the washer turning upon the cone during the process of cutting down.

The invention requires no special construction whatever of the washer. The proper and desired positioning of the washer may be effected by an ordinary driving process. There is no occasion for adjustment after once the washer has been placed upon the cone in the proper position, and this is done when the washer is applied.

The bearing end of the cone may be conical or concaved, as desired, the shape of the bearing end of the cone being immaterial to the invention.

What I claim, and desire to secure by Letters Patent, is—

In a cone-bearing, a cone member having a cylindrical portion and a tapered end, longitudinally-arranged knurls formed on the cylindrical surface, and a protecting-washer having a central aperture of less diameter than the greatest diameter of the cone measured to the apices of the knurled portion, but of greater diameter than the diameter of the cone measured from the bottom of the grooves formed by said knurled portion, said protective washer being arranged to be seated upon said knurled portion of said cone.

CHARLES GLOVER.

Witnesses:
G. ERNEST ROOT,
L. M. BRAMAN.